(12) United States Patent
Mishra et al.

(10) Patent No.: US 10,924,434 B2
(45) Date of Patent: *Feb. 16, 2021

(54) GRACEFUL DESIGNATED ROUTER HANDOFF

(71) Applicant: Cisco Technology, Inc., San Jose, CA (US)

(72) Inventors: Mankamana Mishra, Dublin, CA (US); Krishnaswamy Ananthamurthy, San Ramon, CA (US); Stig Venaas, Oakland, CA (US); Rishabh Parekh, San Jose, CA (US); Sameer Gulrajani, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/417,739

(22) Filed: May 21, 2019

(65) Prior Publication Data

US 2019/0273699 A1 Sep. 5, 2019

Related U.S. Application Data

(63) Continuation of application No. 15/839,886, filed on Dec. 13, 2017, now Pat. No. 10,348,647.

(51) Int. Cl.
*H04L 12/26* (2006.01)
*H04L 12/947* (2013.01)
(Continued)

(52) U.S. Cl.
CPC .......... *H04L 49/25* (2013.01); *H04L 12/1863* (2013.01); *H04L 45/16* (2013.01); *H04L 45/28* (2013.01); *H04L 45/48* (2013.01)

(58) Field of Classification Search
CPC .. H04L 41/06; H04L 41/0654; H04L 41/0668
(Continued)

(56) References Cited

U.S. PATENT DOCUMENTS 6,154,463 A * 11/2000 Aggarwal ............. H04L 12/185
370/408
6,507,562 B1 * 1/2003 Kadansky ........... H04L 12/1877
370/216
(Continued)

OTHER PUBLICATIONS

International Search Report and Written Opinion in counterpart International Application No. PCT/US2018/064199, dated Mar. 29, 2019, 17 pages.
(Continued)

*Primary Examiner* — Dmitry Levitan

(57) ABSTRACT

In one embodiment, a first Protocol Independent Multicast (PIM) router includes port interfaces to receive multicast traffic from a first network and forward the traffic to at least one receiver, which is in a sub-network including other PIM routers, and a routing processor configured, in response to a decision for the first PIM router to relinquish being a designated router, to generate a PIM Hello message with a first option descriptor and a first priority, the first option descriptor indicating a staggered handoff process, and send the PIM Hello message, receipt of the PIM Hello message by the other PIM routers being operative to result in a designated router election electing a new designated router, the new designated router being operative to initiate the staggered handoff process causing the first PIM router to continue forwarding traffic until the new designated router has built a multicast routing tree.

20 Claims, 3 Drawing Sheets

(51) Int. Cl.
  *H04L 12/753* (2013.01)
  *H04L 12/18* (2006.01)
  *H04L 12/703* (2013.01)
  *H04L 12/761* (2013.01)

(58) Field of Classification Search
  USPC .................................. 370/216, 242, 254–256
  See application file for complete search history.

(56) References Cited

U.S. PATENT DOCUMENTS

| | | | |
|---|---|---|---|
| 7,860,093 B2 | 12/2010 | Shepherd et al. | |
| 7,911,977 B2 | 3/2011 | Boers et al. | |
| 8,102,848 B1* | 1/2012 | Rao | H04L 45/16 370/253 |
| 8,121,025 B2 | 2/2012 | Duan et al. | |
| 8,406,125 B2* | 3/2013 | Dholakia | H04L 45/586 370/220 |
| 8,493,846 B2 | 7/2013 | Serbest | |
| 8,576,702 B2 | 11/2013 | Boddapati et al. | |
| 9,100,203 B2* | 8/2015 | Yeung | H04L 12/1877 |
| 9,992,099 B2 | 6/2018 | Cai et al. | |
| 10,122,617 B2 | 11/2018 | Hu et al. | |
| 10,257,074 B1* | 4/2019 | Singh | H04L 45/16 |
| 10,348,647 B2* | 7/2019 | Mishra | H04L 45/48 |
| 2007/0239879 A1 | 10/2007 | Serbest et al. | |
| 2011/0267962 A1 | 11/2011 | Suganya et al. | |
| 2013/0138832 A1* | 5/2013 | Qi | H04L 45/66 709/238 |
| 2016/0080446 A1 | 3/2016 | Karthikeyan et al. | |
| 2017/0005816 A1 | 1/2017 | Chang et al. | |
| 2018/0069830 A1 | 3/2018 | Xu et al. | |
| 2019/0273699 A1* | 9/2019 | Mishra | H04L 45/28 |

OTHER PUBLICATIONS

B. Fenner, et al., "Protocol Independent Multicast—Sparse Mode (PIM-SM): Protocol Specification (Revised)", Network Working Group, RFC 4601, Aug. 2006, 112 pages.

Aruba—a Hewlett Packard Enterprise Company; "ArubaDR-Switch Multicast and Routing"; Guide for WC.16.04 (Part No. 5200-3132c); Published Sep. 2017 edition 4.

Internet Engineering Task Force (IETF); "PIM Designated Router Load Balancing"; [Internet-Draft, Standards Track, draft-ietf-pim-drib-06], Jun. 28, 2017.

Internet Engineering Task Force (IETF); "PIM or Improvement"; [Internet-Draft, Standards Track, draft-ietf-pim-dr-improvement-03.txt], Jun. 6, 2017.

Internet Engineering Task Force (IETF); Mar. 2016; RFC 7761 "Protocol Independent Multicast—Sparse Mode (PIM-SM): Protocol Specification (Revised); Request for Comments: 7761".

Network Working Group—Internet-Draft; "Protocol Independent Multicast DR Load Balancing draft-hou-pim-drib-00.txt", (Mar. 2016).

* cited by examiner

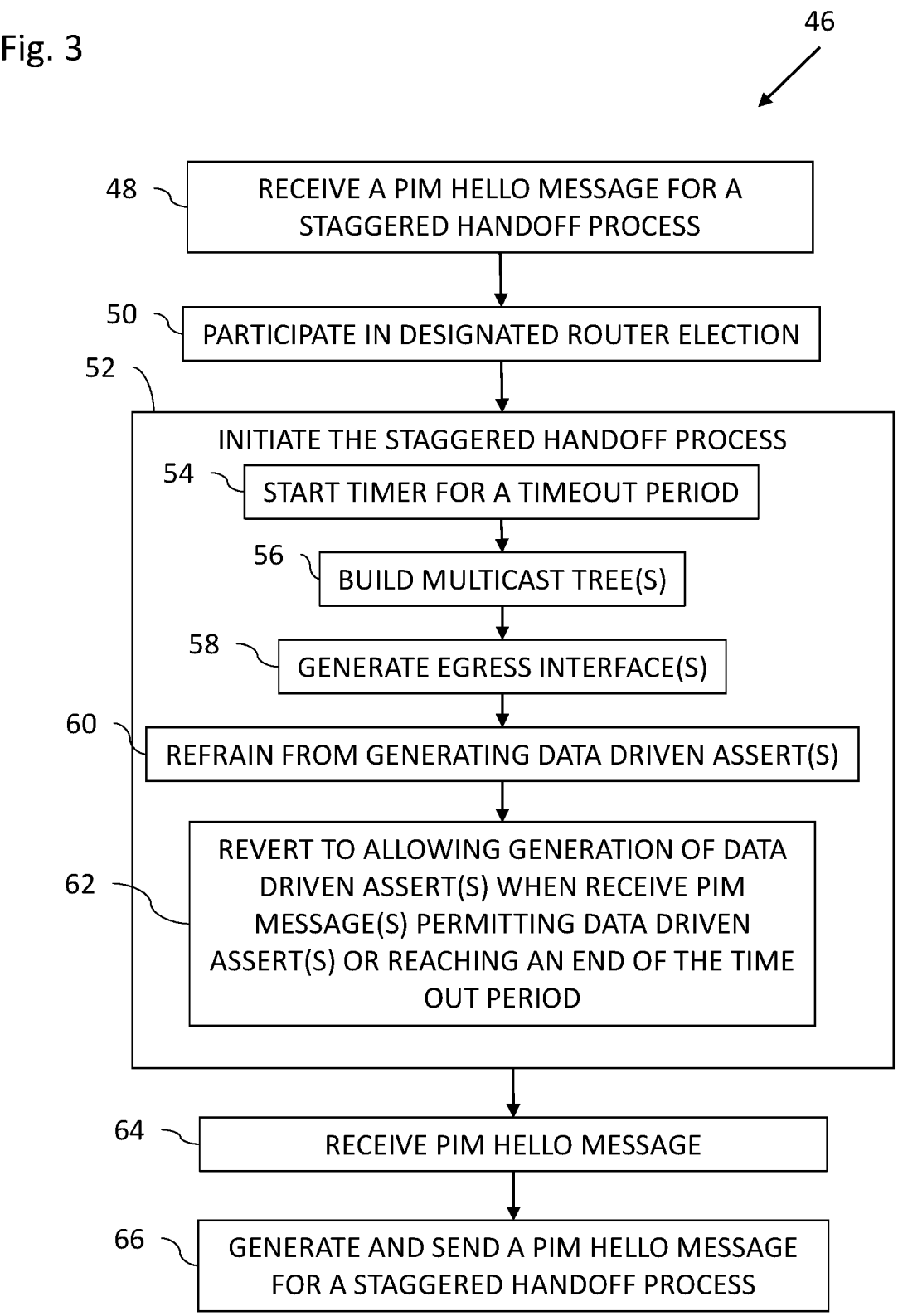

GRACEFUL DESIGNATED ROUTER HANDOFF

CROSS-REFERENCE TO RELATED APPLICATION

This application is a continuation of U.S. patent application Ser. No. 15/839,886, filed Dec. 13, 2017, the entire contents of which are incorporated herein by reference.

TECHNICAL FIELD

The present disclosure generally relates to handoff of designated router role to another router.

BACKGROUND

Protocol Independent Multicast (PIM) is a widely deployed multicast protocol. As defined in Request for Comments (RFC) 7761 of the Internet Engineering Task Force (IETF), a PIM designated router (DR) election is performed in each shared local area network (LAN). A PIM DR is responsible for creating a multicast routing tree upstream. There are many network events, which could initiate a PIM DR re-election. Network events that would trigger DR re-election may be classified into non-deterministic events and deterministic network events. Non-limiting examples of non-deterministic network events include a router, designated as PIM DR, restarting due to power failure or any other hardware failure, which cannot be predicted in advance, or an interface failure. Non-limiting examples of deterministic network events include a router, designated as a PIM DR, going in to maintenance mode, a new router coming up in a network, or a configuration change (e.g., change in priority of the current PIM DR or another one of the PIM routers in the LAN).

Currently, when a PIM router relinquishes its PIM DR role, the PIM router generally: lowers its priority (statically or dynamically), or sends a PIM Hello message with zero hold-time leading to a DR re-election taking place; and stops forwarding traffic. Meanwhile, the newly elected PIM DR starts building a multicast routing tree which takes time, so that traffic is lost while the multicast routing tree is being built.

BRIEF DESCRIPTION OF THE DRAWINGS

The present disclosure will be understood and appreciated more fully from the following detailed description, taken in conjunction with the drawings in which:

FIG. 3 is a flow chart including exemplary steps in a method of operation of another router in the system of FIG. 1.

DESCRIPTION OF EXAMPLE EMBODIMENTS

Overview

There is provided in accordance with an embodiment of the present disclosure, a first Protocol Independent Multicast (PIM) router including a plurality of port interfaces configured to receive multicast traffic from a first network and forward the multicast traffic to at least one receiver, which is in a sub-network, the sub-network including a plurality of other PIM routers, and a routing processor configured, in response to a decision for the first PIM router to relinquish being a designated router in the sub-network, to generate a first PIM Hello message with a first option descriptor and a first priority, wherein (a) the first option descriptor indicates a staggered handoff process, and (b) the first priority is set to be lower than a priority of at least one PIM router of the plurality of other PIM routers in the sub-network, and send the first PIM Hello message for receipt by the plurality of other PIM routers causing a designated router election which elects a new designated router from among the plurality of other PIM routers, the new designated router being operative to initiate the staggered handoff process in response to the first option descriptor, the staggered handoff process causing the first PIM router to continue forwarding multicast traffic from the first network to the at least one receiver until the new designated router has built a multicast routing tree to receive the multicast traffic from the first network.

DETAILED DESCRIPTION

Figure 1:
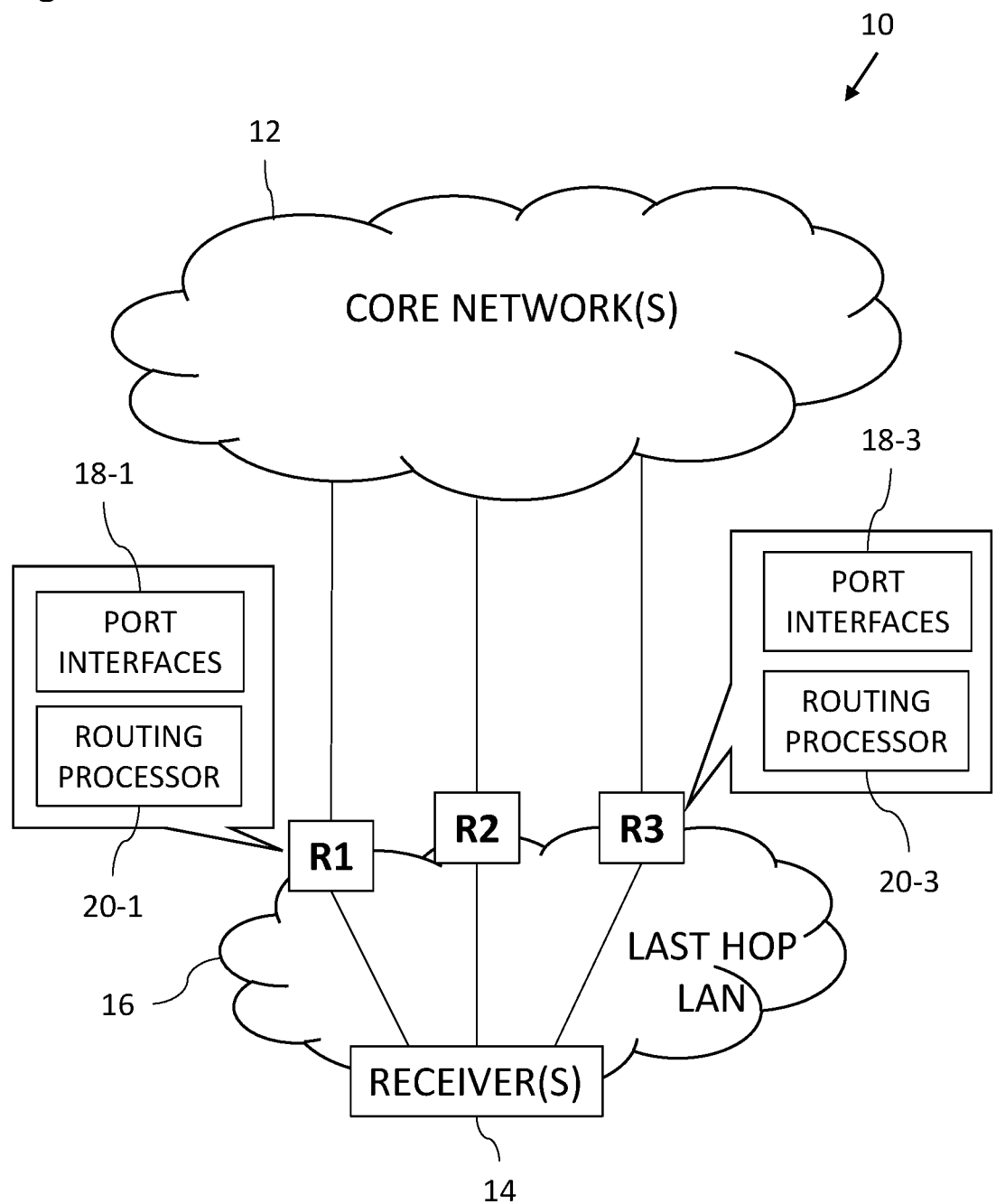
FIG. 1 is a block diagram view of a designated router graceful handoff system constructed and operative in accordance with an embodiment of the present disclosure.

Reference is now made to FIG. 1, which is a block diagram view of a designated router (DR) graceful handoff system 10 constructed and operative in accordance with an embodiment of the present disclosure. The DR graceful handoff system 10 is operative to handoff the DR role to a new DR based on a deterministic network event (e.g., shutting down a Protocol Independent Multicast (PIM) router for maintenance). The handoff process is performed in stages to reduce or prevent traffic loss during handoff and is therefore referred to as a staggered handoff process herein below.

In overview, the staggered handoff process is initiated in a PIM router, which is relinquishing its DR role to another PIM router based on a deterministic network event. The PIM router sends a PIM Hello message with a new option (which may be referred to as DR graceful handoff or DR staggered handoff) to inform a newly elected DR that staggered handoff processing is being requested. Therefore, both the relinquishing DR and the newly elected DR perform the staggered handoff processing in order to reduce or prevent traffic loss. Among other features of the staggered handoff process, the relinquishing DR continues to forward multicast traffic (even after the PIM Hello message with the new option has been sent) until the newly elected DR has successfully built the multicast routing tree and forwards the multicast traffic. It should be noted that the DR graceful handoff system 10 generally provides staggered handoff for a last hop router.

A PIM Hello message is a PIM message with the type field equal to zero. A PIM Hello message includes option type, option length, and option value fields. One or more of the option fields may be used to identify a PIM Hello message as a PIM Hello message to initiate a DR staggered handoff. The term option descriptor used in the specification and claims may refer to one or more of the option fields mentioned above.

The DR graceful handoff system 10 is now described in more detail with reference to the various elements of FIG. 1. FIG. 1 shows three PIM routers, router R1, router R2 and router R3. Initially, the PIM router R1 is elected as the DR. The PIM router R1 receives multicast traffic from one or more networks 12 (e.g. one or more core networks) and forwards the multicast traffic to one or more receivers 14.

The PIM routers R1, R2, and R3 are disposed in a subnetwork 16, e.g., a last hop shared local area network (LAN).

In response to a decision (typically, but not necessarily, by the PIM router R1) to relinquish being a DR in the subnetwork 16, the PIM router R1 is configured to generate a PIM Hello message with an option descriptor and a priority and send the PIM Hello message for receipt by the other PIM routers in the subnetwork 16. The option descriptor indicates that the PIM Hello message is a PIM Hello message to initiate a DR staggered handoff. The priority is set to be lower than a priority of at least one of the other PIM routers in the subnetwork 16. The priority in the PIM Hello message is set to be lower than a priority of at least one other PIM router in the subnetwork 16 so that the PIM router R1 does not win a DR election triggered by sending the PIM Hello message. In order to simplify priority setting, the priority of the PIM Hello message may be set to equal zero by the PIM router R1.

Receipt of the PIM Hello message by the other PIM routers in the subnetwork 16 (e.g., R2 and R3) triggers a DR election mechanism in the subnetwork 16. For the sake of illustration, it is assumed that the PIM router R3 wins the DR election and is now the new DR in the subnetwork 16.

At this stage, the PIM router R3 commences to build a multicast routing tree upstream towards the network(s) 12 for each multicast group of a plurality of multicast groups having local receivers, and to generate an egress interface connected to subnetwork 16, for each of the multicast groups having local receivers. The PIM router R3 also starts a failsafe timer, which is described in more detail below. At this stage, the PIM router R1 continues forwarding received multicast traffic towards the receiver(s) 14. The term "group" used herein refers to multicast group. It should also be noted that any reference to "group" herein, might refer to a source/multicast-group pair.

By way of introduction, in according with PIM, a PIM router may generate a data driven assert when receiving duplicate traffic. In the current situation, if the PIM router R3 generates a data driven assert, at this stage before the multicast routing tree is built, the PIM router R1 may issue a PIM Assert Cancel message and would stop forwarding multicast traffic resulting in traffic loss. For example, the PIM router R3 may receive traffic via the egress interface, which without receipt of the PIM Hello message would result in the PIM router R3 generating a data driven assert and traffic loss. However, in accordance with the staggered handoff process, the PIM router R3 is configured to refrain from generating a data driven assert after the PIM Hello message is received until, the earlier of: the PIM router R3 receiving a PIM Assert Cancel message (or similar message) from the PIM router R1; or the failsafe timer reaching the end of a timeout period. The failsafe timer is started so that the PIM router R3 reverts to allowing the generation of a data driven Assert even if the PIM router R1 fails to send the PIM Assert Cancel message due to an unavoidable network event or if the PIM Assert Cancel message is not received by R3. It should be noted that the PIM message and the DR role are group and flow independent, whereas the multicast routing tree, the egress interface, and the Assert messages are group or flow specific.

As soon as the PIM router R3 starts receiving multicast traffic from the network(s) 12, the PIM router R3 forwards the multicast traffic to the receiver(s) 14. Since the PIM router R1 has sent the PIM Hello message, the PIM router R1 sends a PIM Assert Cancel, for receipt by the PIM router R3, when the PIM router R1 receives duplicate multicast traffic for a flow. At this stage, the PIM router R1 stops forwarding the multicast traffic for the group associated with the flow having the duplicate multicast traffic. When the PIM router R3 receives the PIM Assert Cancel, it reverts to allowing generation of a data driven Assert for that group. When detecting duplicate traffic for a group, the PIM router R1 sends a PIM Assert Cancel for that group for receipt by the PIM router R3 and stops forwarding traffic for that group. The above is performed for other groups until the PIM router R1 is no longer forwarding traffic.

At this stage, the PIM router R3 is now forwarding all the multicast traffic received from the network(s) 12 to the receiver(s) 14, and the PIM router R1 is not forwarding multicast traffic from the network(s) 12 to the receiver(s) 14. The PIM router R1 may now transition to maintenance mode if that was the deterministic network event that triggered the PIM router R1 to send the PIM Hello message.

It will be appreciated that the PIM router R1 may also have been triggered to send the PIM Hello message with the staggered handoff processing option if another PIM router with a higher priority joins the subnetwork 16 or if a current PIM router in the subnetwork 16 now has a higher priority than the PIM router R1.

Assuming that the PIM router R1 transitioned to maintenance mode and now the PIM router R1 transitions from maintenance mode back to operational mode, the PIM router R1 send a PIM Hello message with the real priority of the PIM router R1. The PIM router R3 detects that the PIM router R1 has a higher priority than the PIM router R3 which triggers the PIM router R3 to send a PIM Hello message with the staggered handoff processing option in order to initiate a staggered transfer from the PIM router R3 back to the PIM router R1 based on the staggered handoff processing described above. In this case, the PIM Hello message priority can be the real priority of the PIM router R3 because the PIM router R1 has a higher priority than the priority of the PIM router R3.

As described above, the DR graceful handoff system 10 allows a smooth transition of a last hop DR. The DR graceful handoff system 10 does not need to handle smooth transition of a first hop DR to another first hop DR.

The DR graceful handoff system 10 may be implemented in a sub-network where all the PIM routers are configured to recognize the PIM Hello message with the staggered handoff process option and process the staggered handoff process. Additionally, the DR graceful handoff system 10 may be implemented in a hybrid network where one or more routers (compliant routers) are configured to recognize the PIM Hello message with the staggered handoff process option and process the staggered handoff process, and one or more routers (non-compliant routers) do not recognize the PIM Hello message with the staggered handoff process option and do not process the staggered handoff process. By way of example, consider a hybrid network including six PIM routers, R1, R2, R3, R4, R5, and R6 in the subnetwork 16 (note that PIM routers R4, R5, and R6 are not shown in FIG. 1). Routers R1 to R4 are compliant routers and routers R5 and R6 are non-compliant routers. Assuming that R1 is initially the DR and a decision is made for R1 to relinquish the DR role. R1 sends out a PIM Hello message with the staggered handoff process option. If the newly elected DR is one of the compliant routers, the process described above for staggered handoff in R1 and in the newly elected DR is performed. If the newly elected DR is one of the non-compliant routers, then the newly elected DR would start to build a multicast routing tree upstream and when traffic is detected by the newly elected DR, the newly elected DR would generate a data driven Assert. If R1 sends any Assert messages, as specified in the PIM protocol, while R1 is a relinquishing DR, R1 may optionally set the Assert message metric to infinity. Setting the Assert metric to infinity ensures that R1 loses the Assert state to the newly elected DR, which will start to receive and forward multicast traffic as the multicast routing tree is built.

The PIM router R1 of FIG. 1 includes a plurality of port interfaces 18-1 and a routing processor 20-1 and other elements (not shown). The port interfaces 18-1 are configured to receive multicast traffic from the network(s) 12 and forward the multicast traffic to the at least one receiver 14. The routing processor 20-1 is described in more detail below with reference to FIG. 2.

The PIM router R3 of FIG. 1 includes a plurality of port interfaces 18-3 and a routing processor 20-3 and other elements (not shown). The plurality of port interfaces 18-3 are configured to receive and forward multicast traffic. The routing processor 20-3 is described in more detail below with reference to FIG. 3.

The DR graceful handoff system 10 is now described in more detail with reference to FIGS. 2 and 3 based on the assumption that the initial PIM DR is the PIM router R1 and the newly elected DR is the PIM router R3.

Figure 2:
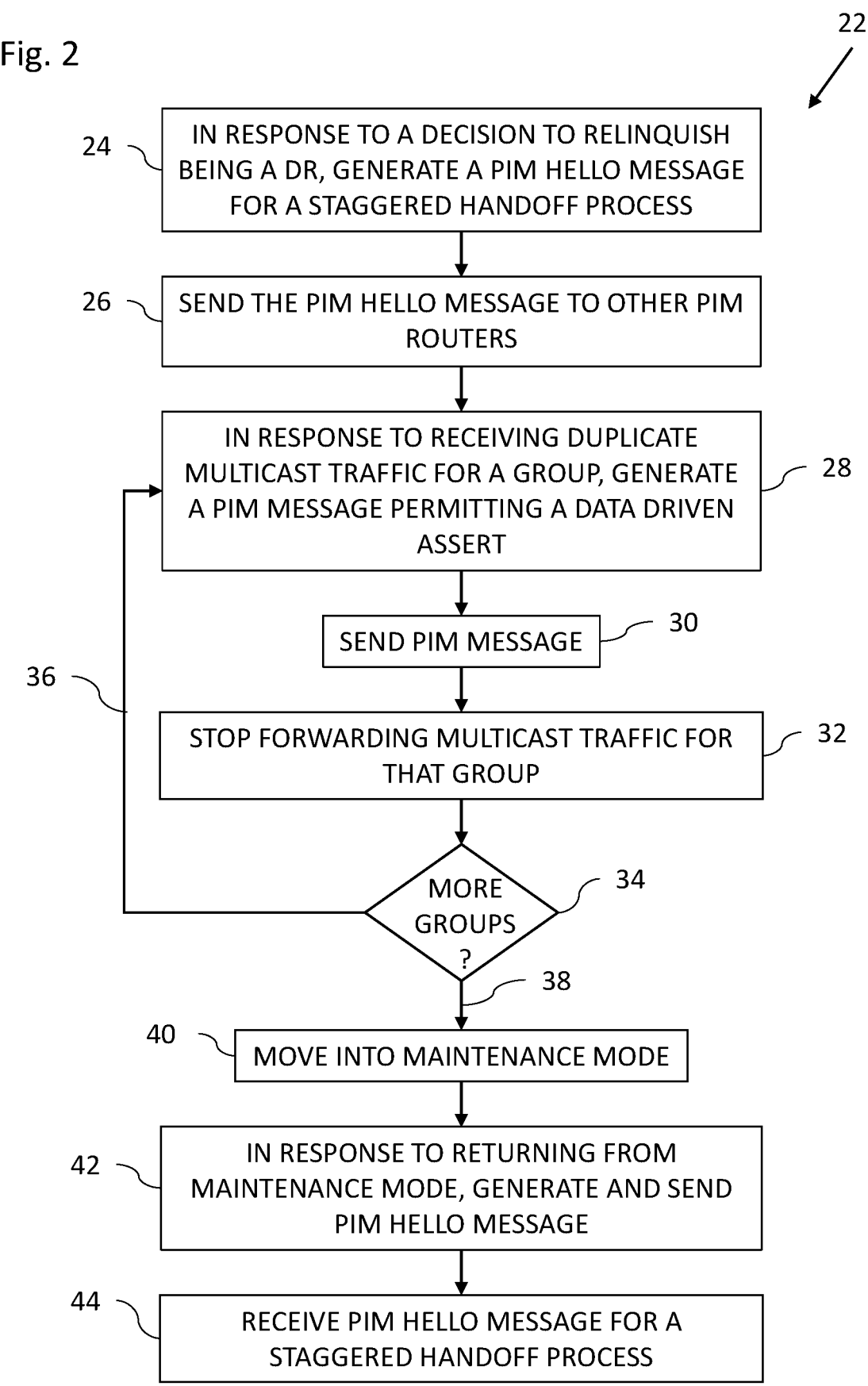
FIG. 2 is a flow chart including exemplary steps in a method of operation of a router in the system of FIG. 1.

Reference is now made to FIG. 2, which is a flow chart 22 including exemplary steps in a method of operation of the router R1 in the system 10 of FIG. 1. Reference is also made to FIG. 1.

The routing processor 20-1 is configured, in response to a decision for the PIM router R1 to relinquish being a DR in the sub-network 16, to generate a first PIM Hello message with a first option descriptor and a first priority (block 24). The first option descriptor indicates a staggered handoff process. The first priority is set to be lower than a priority of at least one PIM router of the other PIM routers in the sub-network 16. The first priority may be set to equal zero.

The routing processor 20-1 is configured, in response to the decision for the PIM router R1 to relinquish being a DR in the sub-network 16, to send the first PIM Hello message for receipt by the other PIM routers in the sub-network 16 (block 26). Receipt of the first PIM Hello message by the other PIM routers in the subnetwork 16 is operative to result in a DR election, which elects a new DR (the PIM router R3) from among the other PIM routers. The new DR (the PIM router R3) is operative to initiate the staggered handoff process in response to the first option descriptor. The staggered handoff process causes the PIM router R1 to continue forwarding multicast traffic from the network(s) 12 to the at least one receiver 14 until the new DR (the PIM router R3) has built a multicast routing tree to receive the multicast traffic from the network(s) 12.

The routing processor 20-1 is configured, in response to receiving duplicate multicast traffic for a first group from the network(s) 12 on at least one of the plurality of interface ports 18-1, to: generate a second PIM message (e.g., a PIM Assert Cancel message or a custom PIM message) for the first group (block 28); send the second PIM message to the new DR (the PIM router R3) (block 30); and stop forwarding multicast network traffic for the first group from the network(s) 12 to the at least one receiver 14 (block 32). The second PIM message indicates that the new DR (the PIM router R3) is permitted to generate a data driven PIM assert with respect to the first group. At decision block 34, the routing processor 20-1 determines if there is still traffic of other groups being forwarded. If there are more groups for which traffic is being forwarded by the PIM router R1 (branch 36), the steps of blocks 28-32 are repeated for the other groups when duplicate traffic for the other groups is received. If there are no more groups for which traffic is being forwarded by the PIM router R1 (branch 38), the routing processor 20-1 is configured to move the PIM router R1 into a maintenance mode (block 40). It should be noted that the step of block 40, and the steps of blocks 42 and 44 described below, are performed if the deterministic network event, which triggered the PIM router R1 to send the first Hello message, was to transition the PIM router R1 into maintenance mode.

The routing processor 20-1 is configured: in response to returning from the maintenance mode, to generate and send a third PIM Hello message with a second priority which is higher than the priority of the new DR (the PIM router R3) (block 42); and receive a fourth PIM Hello message from the new DR (the PIM router R3) with an option descriptor indicating a staggered handoff process from the new DR (the PIM router R3) (block 44).

Reference has been made herein to first, second, third, and fourth messages in the specification and claims. It should be noted that the term "first", "second" etc. does not refer to an order of the messages, but is used as a way to differentiate one message from another. It should also be noted that each of the messages (first, second, third, and fourth) might be sent repeatedly and periodically. For example, the first PIM Hello message may be sent periodically by R1 until R1 transitions into maintenance mode, and while in maintenance mode R1 may send period PIM Hello messages with a low priority (without the option descriptor indicating a staggered handoff process). Additionally, the second PIM message may be group specific giving a second PIM message per group (source-group pair).

Reference is now made to FIG. 3, which is a flow chart 46 including exemplary steps in a method of operation of the PIM router R3 in the system 10 of FIG. 1. Reference is also made to FIG. 1. The routing processor 20-3 is configured to receive, from the PIM router R1 (which is a DR in a sub-network 16), the first PIM Hello message with the first option descriptor and the first priority (block 48).

The routing processor 20-3 is configured, in response to receiving the first PIM Hello message, to participate in the DR election (block 50), which elects the PIM router R3 as the new DR from among the plurality of other PIM routers. The routing processor 20-3 is configured to initiate the staggered handoff process in response to the first option descriptor (block 52).

In accordance with the staggered handoff process of block 52, the routing processor 20-3 is configured to perform the steps of blocks 54-62 described in more detail below. The routing processor 20-3 is configured to start a timer to track the end of the timeout period (block 54). The timer may be started from receiving the first PIM Hello message or from being elected as the DR or any other suitable start time. The routing processor 20-3 is configured to build the multicast routing tree, for each multicast group of a plurality of multicast groups having local receivers, to receive the multicast traffic from the network(s) 12 (block 56). The routing processor 20-3 is configured to generate the egress interface, for each of the multicast groups having local receivers, to forward multicast traffic towards the at least one receiver 14 (block 58).

The routing processor 20-3 is configured to refrain from generating a data driven Assert (block 60) until the earlier of: (a) receipt of the second PIM message (e.g., a PIM Assert Cancel message or other custom message) from the PIM router R1; or (b) reaching the end of the timeout period. The second PIM message may be group specific as explained above. The routing processor 20-3 is configured to revert to allowing generation of a data driven Assert (for the group for which the second PIM message was received) (block 62) after the earlier of: (a) receipt of the second PIM message (for that group) from the PIM router R1; or (b) reaching the end of the timeout period. As the second PIM message is group specific, refraining from generating a data driven Assert for a group will be maintained until the second PIM message for that group is received from the PIM router R1 or until reaching the end of the timeout period (whichever is earlier). At this point, the port interfaces 18-3 are configured to receive the multicast traffic from the network(s) 12 and forward the multicast traffic to the at least one receiver 14 in the sub-network 16.

Based on an event, for example, but not limited to, the PIM router R1 transitioning from maintenance mode to operational mode, the routing processor 20-3 is configured to receive, from the PIM router R1, the third PIM Hello message with the second priority, which is higher than the priority of the PIM router R3 (block 64). The routing processor 20-3 is configured, in response to receiving the third PIM Hello message with the second priority, which is higher than the priority of the PIM router R3, to generate and send a fourth PIM Hello message with an option descriptor indicating a staggered handoff process from the PIM router R3 (block 66).

In practice, some or all of the functions of each routing processor 20 may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A method comprising:
   receiving, by a first router from a second router, a first Hello message with a first option descriptor and a first priority, wherein the second router is a designated router in a sub-network;
   in response to receiving the first Hello message, participating in a designated router election which elects the first router as a new designated router from among a plurality of other routers in the sub-network; and
   initiating a staggered handoff process in response to the first option descriptor, the staggered handoff process causing the second router to continue forwarding multicast traffic from a first network to at least one receiver until the new designated router has built a multicast routing tree to receive the multicast traffic from the first network.

2. The method of claim 1, wherein the first option descriptor indicates the staggered handoff process and the first priority is set to be lower than a priority of at least one router of the plurality of other routers in the sub-network.

3. The method of claim 1, wherein the first priority is set equal to zero.

4. The method of claim 1, wherein the first router is a first Protocol Independent Multicast (PIM) router and the second router is a second PIM router.

5. The method of claim 1, wherein the staggered handoff process comprises:
   building, by the first router, which is the new designated router, the multicast routing tree to receive the multicast traffic from the first network;
   generating an egress interface to forward the multicast traffic towards the at least one receiver;
   refraining from generating a data driven Assert until: (a) receipt of a second message from the second router, the second message indicating that the new designated router is permitted to generate a data driven Assert; or (b) reaching an end of a timeout period; and
   receiving the multicast traffic from the first network and forwarding the multicast traffic to the at least one receiver in the sub-network.

6. The method of claim 5, wherein the staggered handoff process further comprises reverting to allow generation of a data driven Assert after: (a) receipt of the second message from the second router; or (b) reaching the end of the timeout period.

7. The method of claim 5, further comprising:
   starting a timer to track the end of the timeout period.

8. The method of claim 5, wherein the second message is a Protocol Independent Multicast (PIM) Assert Cancel message.

9. One or more non-transitory computer readable storage media encoded with instructions that, when executed by a processor, cause the processor to perform operations, comprising:
   receiving, by a first router from a second router, a first Hello message with a first option descriptor and a first priority, wherein the second router is a designated router in a sub-network;
   in response to receiving the first Hello message, participating in a designated router election which elects the first router as a new designated router from among a plurality of other routers in the sub-network; and
   initiating a staggered handoff process in response to the first option descriptor, the staggered handoff process causing the second router to continue forwarding multicast traffic from a first network to at least one receiver until the new designated router has built a multicast routing tree to receive the multicast traffic from the first network.

10. The media claim 9, wherein the first option descriptor indicates the staggered handoff process and the first priority is set to be lower than a priority of at least one router of the plurality of other routers in the sub-network.

11. The media of claim 9, wherein the first priority is set equal to zero.

12. The media of claim 9, wherein the staggered handoff process comprises:
building, by the first router, which is the new designated router, the multicast routing tree to receive the multicast traffic from the first network;
generating an egress interface to forward the multicast traffic towards the at least one receiver;
refraining from generating a data driven Assert until: (a) receipt of a second message from the second router, the second message indicating that the new designated router is permitted to generate a data driven Assert; or (b) reaching an end of a timeout period; and
receiving the multicast traffic from the first network and forwarding the multicast traffic to the at least one receiver in the sub-network.

13. The media of claim 12, wherein the staggered handoff process further comprises reverting to allow generation of a data driven Assert after: (a) receipt of the second message from the second router; or (b) reaching the end of the timeout period.

14. The media of claim 12, wherein the staggered handoff process further comprises starting a timer to track the end of the timeout period.

15. The media of claim 12, wherein the second message is a Protocol Independent Multicast (PIM) Assert Cancel message.

16. A first router comprising:
a plurality of port interfaces; and
a processor configured to:
receive, from a second router, a first Hello message with a first option descriptor and a first priority, wherein the second router is a designated router in a sub-network;
in response to receiving the first Hello message, participate in a designated router election which elects the first router as a new designated router from among a plurality of other routers in the sub-network; and
initiate a staggered handoff process in response to the first option descriptor, the staggered handoff process causing the second router to continue to forward multicast traffic from a first network to at least one receiver until the new designated router has built a multicast routing tree to receive the multicast traffic from the first network.

17. The first router of claim 16, wherein the first option descriptor indicates the staggered handoff process and the first priority is set to be lower than a priority of at least one router of the plurality of other routers in the sub-network.

18. The first router of claim 16, wherein the first priority is set equal to zero.

19. The first router of claim 16, wherein for the staggered handoff process the processor is configured to:
build the multicast routing tree to receive the multicast traffic from the first network;
generate an egress interface to forward the multicast traffic towards the at least one receiver; and
refrain from generating a data driven Assert until: (a) receipt of a second message from the second router, the second message indicating that the new designated router is permitted to generate a data driven Assert; or (b) reaching an end of a timeout period, wherein the plurality of port interfaces of the first router are configured to receive the multicast traffic from the first network and forward the multicast traffic to the at least one receiver in the sub-network.

20. The first router of claim 16, wherein the first router is a first Protocol Independent Multicast (PIM) router and the second router is a second PIM router.

* * * * *